(12) United States Patent
Kadous et al.

(10) Patent No.: US 10,405,242 B2
(45) Date of Patent: Sep. 3, 2019

(54) ROBUST CHANNEL RESERVATION ON A SHARED COMMUNICATION MEDIUM

(71) Applicant: QUALCOMM Incorporated, San Diego, CA (US)

(72) Inventors: Tamer Adel Kadous, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 15/260,233

(22) Filed: Sep. 8, 2016

(65) Prior Publication Data

US 2018/0054762 A1    Feb. 22, 2018

Related U.S. Application Data

(60) Provisional application No. 62/377,524, filed on Aug. 19, 2016.

(51) Int. Cl.
*H04W 88/02*  (2009.01)
*H04W 28/26*  (2009.01)
(Continued)

(52) U.S. Cl.
CPC ............ *H04W 28/26* (2013.01); *H04L 47/72* (2013.01); *H04L 47/821* (2013.01); *H04L 65/10* (2013.01); *H04W 16/16* (2013.01); *H04W 74/002* (2013.01); *H04W 74/0808* (2013.01); *H04W 74/0816* (2013.01); *H04W 88/023* (2013.01); *H04W 16/14* (2013.01); *H04W 84/042* (2013.01)

(58) Field of Classification Search
CPC ........... H04W 74/0866; H04W 74/002; H04W 28/26; H04W 88/023; H04L 47/72; H04L 47/821
See application file for complete search history.

(56) References Cited

U.S. PATENT DOCUMENTS

2014/0112289 A1   4/2014  Kim et al.
2014/0341207 A1  11/2014  Bhushan et al.
(Continued)

OTHER PUBLICATIONS

R1-145167, "Robust Coexistence LAA-LTE", Nov. 17-21, 2014 (Year: 2014).*
(Continued)

*Primary Examiner* — Salvador E Rivas
(74) *Attorney, Agent, or Firm* — Muncy, Geissler, Olds & Lowe

(57) ABSTRACT

Techniques for managing channel reservation on a shared communication medium are disclosed. An access point or an access terminal contending for access to a communication medium shared between a first Radio Access Technology (RAT) and a second RAT, for example, may encode a first portion of a channel reservation message defined by the first RAT with a transmission opportunity duration associated with the second RAT and also encode a second portion of the channel reservation message with the transmission opportunity duration. The access point or the access terminal may then transmit, over the communication medium, the channel reservation message including the first and second portions to reserve the communication medium based on the contending.

34 Claims, 13 Drawing Sheets

(51) Int. Cl.

| | |
|---|---|
| *H04L 12/911* | (2013.01) |
| *H04L 29/06* | (2006.01) |
| *H04W 16/16* | (2009.01) |
| *H04W 74/00* | (2009.01) |
| *H04W 74/08* | (2009.01) |
| *H04W 84/04* | (2009.01) |
| *H04W 16/14* | (2009.01) |

(56) References Cited

U.S. PATENT DOCUMENTS

| | | | |
|---|---|---|---|
| 2015/0223075 A1* | 8/2015 | Bashar | H04W 16/14 370/329 |
| 2016/0057770 A1 | 2/2016 | Yerramalli et al. | |
| 2016/0128130 A1 | 5/2016 | Sadek et al. | |
| 2016/0150536 A1 | 5/2016 | Valliappan et al. | |
| 2016/0192363 A1* | 6/2016 | Kasher | H04L 5/00 370/329 |
| 2017/0289818 A1* | 10/2017 | Ng | H04W 48/12 |
| 2018/0020448 A1* | 1/2018 | Huang | H04B 7/0452 |

OTHER PUBLICATIONS

Broadcom Corporation et al., "Robust Coexistence LAA-LTE", 3GPP Draft; R1-145167_ROBUSTCOEXISTENCELAA—Final, 3rd Generation Partnership Project (3GPP), Mobile Competence Centre ; 650, Route Des Lucioles ; F-06921 Sophia-Antipolis Cedex ; France vol. RAN WG1, No. San Francisco, USA; Nov. 17-Nov. 21, 2014 Nov. 17, 2014 (Nov. 17, 2014), XP050876190, Retrieved from the Internet: URL:http://www.3gpp.org/ftp/Meetings_3GPP SYNC/RAN1/Docs/.

International Search Report and Written Opinion—PCT/US2017/042789—ISA/EPO—dated Oct. 11, 2017.

Chen H-Y., et al., "Handover Mechanism for Device-to-Device Communication," 2015, 6 pages.

Wang W., et al., "Changing Channel without Strings: Coordination-Free Wideband Spectrum Adaption," IEEE INFOCOM, 2015, pp. 460-468.

* cited by examiner

ROBUST CHANNEL RESERVATION ON A SHARED COMMUNICATION MEDIUM

CROSS-REFERENCE TO RELATED APPLICATIONS

The present application claims the benefit of U.S. Provisional Application No. 62/377,524, entitled "Robust Channel Reservation on a Shared Communication Medium," filed Aug. 19, 2016, assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, contending for access to a communication medium shared between a first Radio Access Technology (RAT) and a second RAT; encoding a first portion of a channel reservation message defined by the first RAT with a transmission opportunity duration associated with the second RAT; encoding a second portion of the channel reservation message with the transmission opportunity duration; and transmitting, over the communication medium, the channel reservation message including the first and second portions to reserve the communication medium based on the contending.

In another example, a communication apparatus is disclosed. The apparatus may include, for example, at least one processor, at least one memory coupled to the at least one processor, and a transceiver. The at least one processor and the at least one memory may be configured to contend for access to a communication medium shared between a first RAT and a second RAT, encode a first portion of a channel reservation message defined by the first RAT with a transmission opportunity duration associated with the second RAT, and encode a second portion of the channel reservation message with the transmission opportunity duration. The transceiver may be configured to transmit, over the communication medium, the channel reservation message including the first and second portions to reserve the communication medium based on the contending.

In another example, another communication apparatus is disclosed. The apparatus may include, for example, means for contending for access to a communication medium shared between a first RAT and a second RAT; means for encoding a first portion of a channel reservation message defined by the first RAT with a transmission opportunity duration associated with the second RAT; means for encoding a second portion of the channel reservation message with the transmission opportunity duration; and means for transmitting, over the communication medium, the channel reservation message including the first and second portions to reserve the communication medium based on the contending.

In another example, a transitory or non-transitory computer-readable medium is disclosed. The computer-readable medium may include, for example, code for contending for access to a communication medium shared between a first RAT and a second RAT; code for encoding a first portion of a channel reservation message defined by the first RAT with a transmission opportunity duration associated with the second RAT; code for encoding a second portion of the channel reservation message with the transmission opportunity duration; and code for transmitting, over the communication medium, the channel reservation message including the first and second portions to reserve the communication medium based on the contending.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to robust channel reservation on a communication medium shared with multiple Radio Access Technologies (RATs). To improve coordination with certain devices operating in accordance with a RAT that is different than the RAT defining a given channel reservation message, the channel reservation message may be provisioned with redundant transmission opportunity duration information. This information may be encoded into a portion of the channel reservation message that does not require full packet decoding capabilities, such as a physical header portion. Operator identifier information may also be encoded into such a portion of the channel reservation message. Various fields may be used for conveying the transmission opportunity duration and/or operator identifier information, such as a length field, a rate field, a reserved field, and so on, or any combination thereof. The transmission opportunity duration and/or operator identifier information may also be spread across multiple channel reservation messages to avoid modifying certain aspects of each channel reservation message (e.g., the rate field). These distinct channel reservation messages may be identified as being related to each other in different ways, such as by a characteristic spacing between them.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
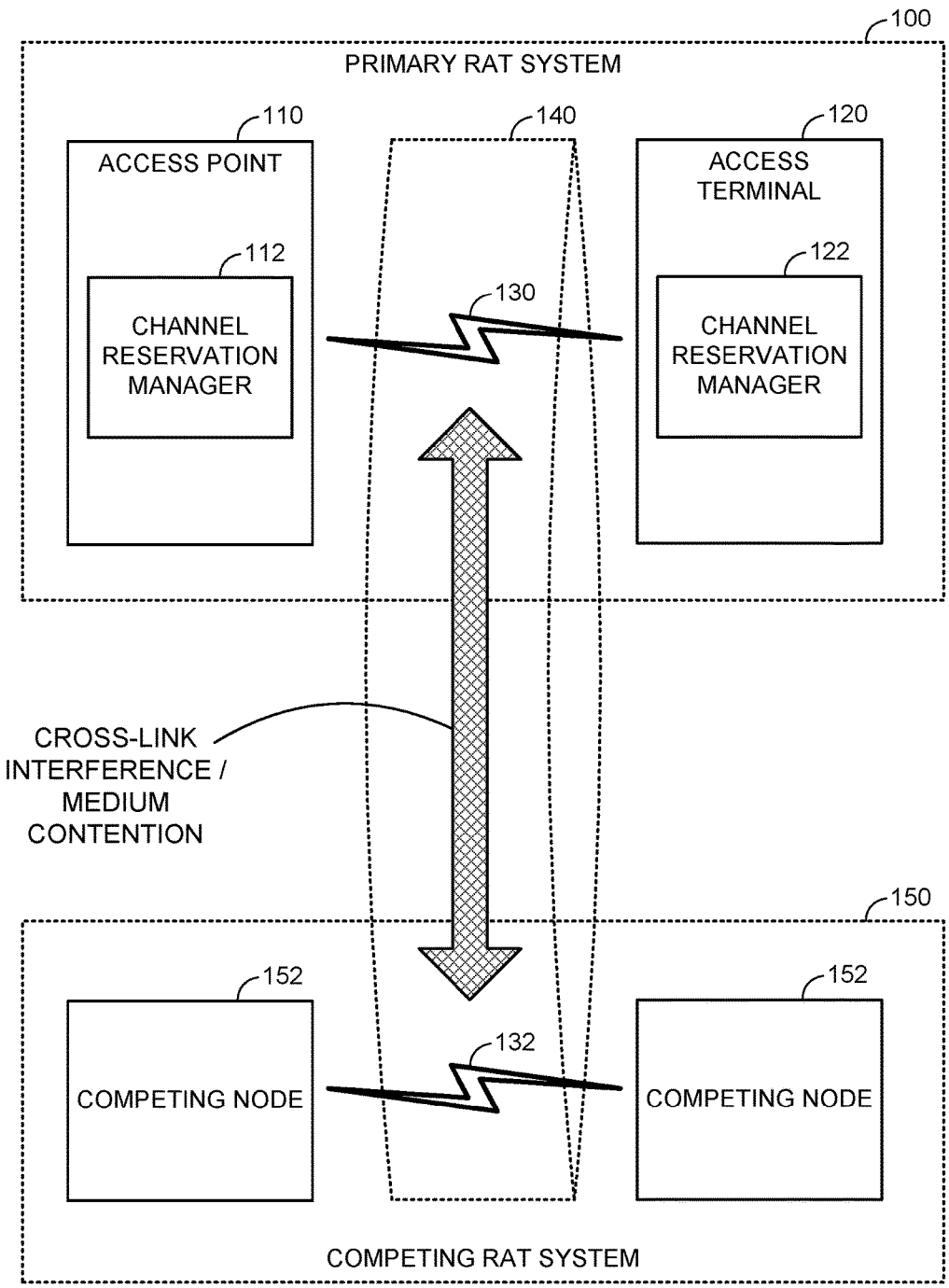
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (TOE) capable device, in-vehicle communication device, etc.), and may be alternatively referred to in different RAT environments as a User Device (UD), a Mobile Station (MS), a Subscriber Station (STA), a User Equipment (UE), etc. An UE may comprise a cellular telephone, a smart phone, a cordless telephone, a Session Initiation Protocol ("SIP") phone, a wireless local loop ("WLL") station, wireless modems, a personal digital assistant ("PDA"), a tablet, a netbook, a smartbook, an ultrabook, a handheld device having wireless connection capability, a Station ("STA"), or some other suitable processing device connected to a wireless modem. One or more aspects taught herein may be incorporated into or operate in connection with a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, healthcare device or equipment, biometric sensors/devices, an entertainment device (e.g., music device, video device, satellite radio, gaming device, etc.), a drone, a robot/robotic device, a vehicular component or sensor, smart meters/sensors, industrial manufacturing equipment, a positioning or position location device, or any other suitable device that is configured to communicate via a wireless or wired medium. An access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the channel reservation techniques discussed briefly above. For example, the access point 110 may include a channel reservation manager 112 and the access terminal 120 may include a channel reservation manager 122. The channel reservation manager 112 and/or the channel reservation manager 122 may be configured in different ways to manage transmission and reception of information.

Figure 2:
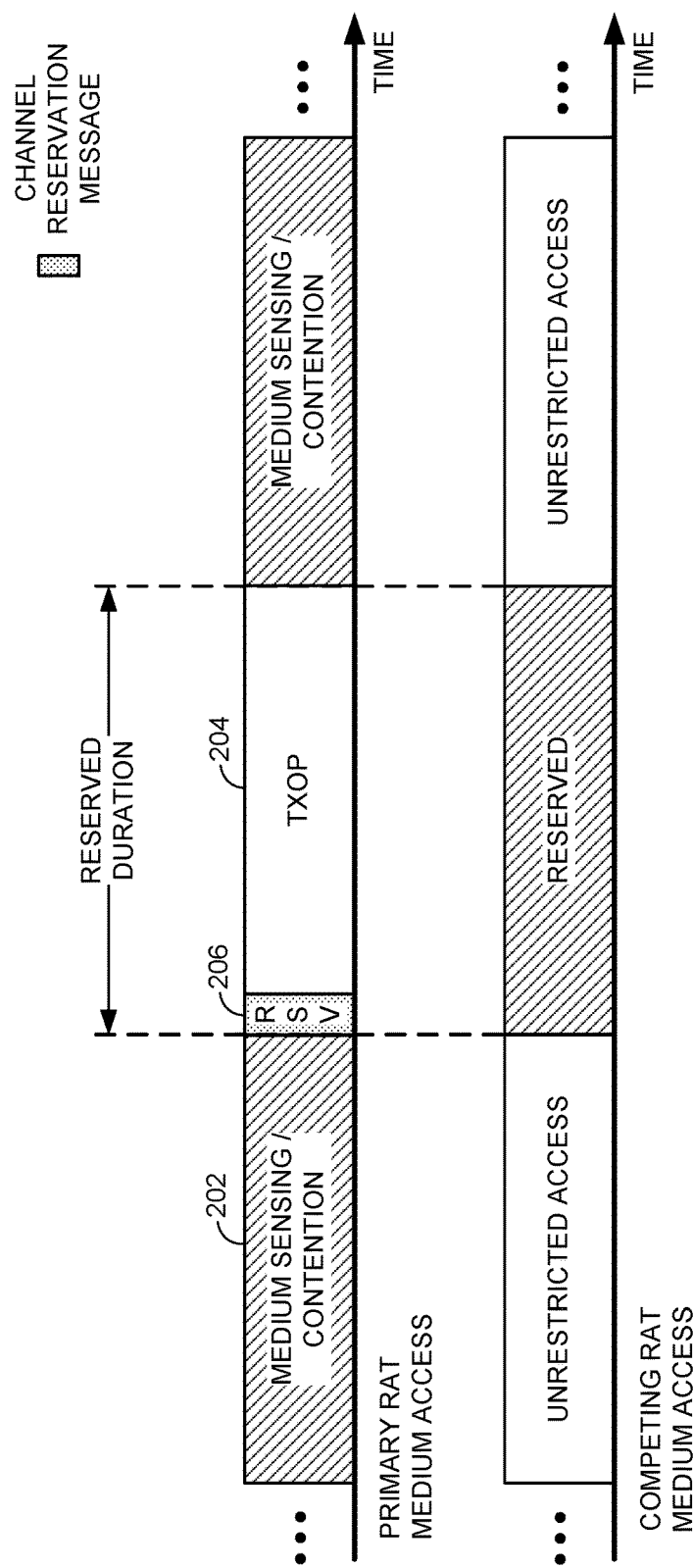
FIG. 2 illustrates certain aspects of an example contention-based medium access scheme.

FIG. 2 illustrates certain aspects of an example contention-based medium access scheme that may be implemented on the communication medium 140. The contention-based medium access scheme may provide time-division-based co-existence between the primary RAT system 100 and the competing RAT system 150. As shown, during a first period of time 202, the primary RAT system 100 may contend for access to the communication medium 140 (e.g., perform CCA). During a second period of time 204, the primary RAT system 100 may be afforded a Transmission Opportunity (TXOP) once access to the communication medium 140 is secured.

To improve co-existence with the competing RAT system 150, the primary RAT system 100 may transmit a channel reservation message 206 over the communication medium 140 to reserve the communication medium 140 for primary RAT operation. The channel reservation message 206 may cause the competing nodes 152 of the competing RAT system 150 to refrain from transmitting (backoff) during not only the duration of the channel reservation message 206 itself, but also for a corresponding transmission opportunity duration encoded into the channel reservation message 206 (e.g., in accordance with a Network Allocation Vector (NAV)). Example channel reservation messages may include, for example, Clear-to-Send-to-Self (CTS2S) messages, Request-to-Send (RTS) messages, Clear-to-Send (CTS) messages, and the like for a competing Wi-Fi RAT, or other similar messages defined for other competing RATs of interest.

In addition, in order to improve so-called resource "reuse" for primary RAT operation (e.g., promote "reuse 1" among same-operator devices), the channel reservation message 206 may be provisioned with an operator identifier (e.g., Public Land Mobile Network Identifier (PLMN ID)) to distinguish it from native signaling by the competing RAT system 150. Primary RAT devices of the primary RAT system 100 may be configured to ignore channel reservation messages from their own operator and instead rely on the built-in interference mitigation of the primary RAT itself to operate concurrently. Example identifiers may include new special-purpose identifiers or preexisting, repurposed identifiers selected to convey primary RAT operation. By utilizing such an identifier in conjunction with the channel reservation mechanism defined by the competing RAT system 150, a "mixed-mode" Medium Access Control (MAC) scheme may be employed that takes advantage of the MAC procedures provided by both RATs without one interfering with the other (e.g., without a Wi-Fi MAC procedure causing an LTE MAC procedure to restrict medium access based on what may be incorrectly perceived as Wi-Fi medium utilization).

As will be described in more detail below, however, the access point 110 or some other device of the primary RAT system 100 may only have a limited-functionality secondary-RAT transceiver (e.g., a basic legacy preamble decoder) and may not be able to perform full packet decoding of the channel reservation message 206. Without full packet decoding, the access point 110 may not be able to read the transmission opportunity duration or the operator identifier from the channel reservation message 206, and may therefore yield the communication medium 140 only for the duration of the channel reservation message 206 itself (rather than the longer transmission opportunity duration) and may not be able to distinguish reservations for the primary RAT system 100 from those for the competing RAT system 150. To assist limited-functionality devices and improve general conformance overall, techniques are provided herein for modifying a preamble or header portion of the channel reservation message 206 to indicate additional reservation parameter information.

Figure 3:
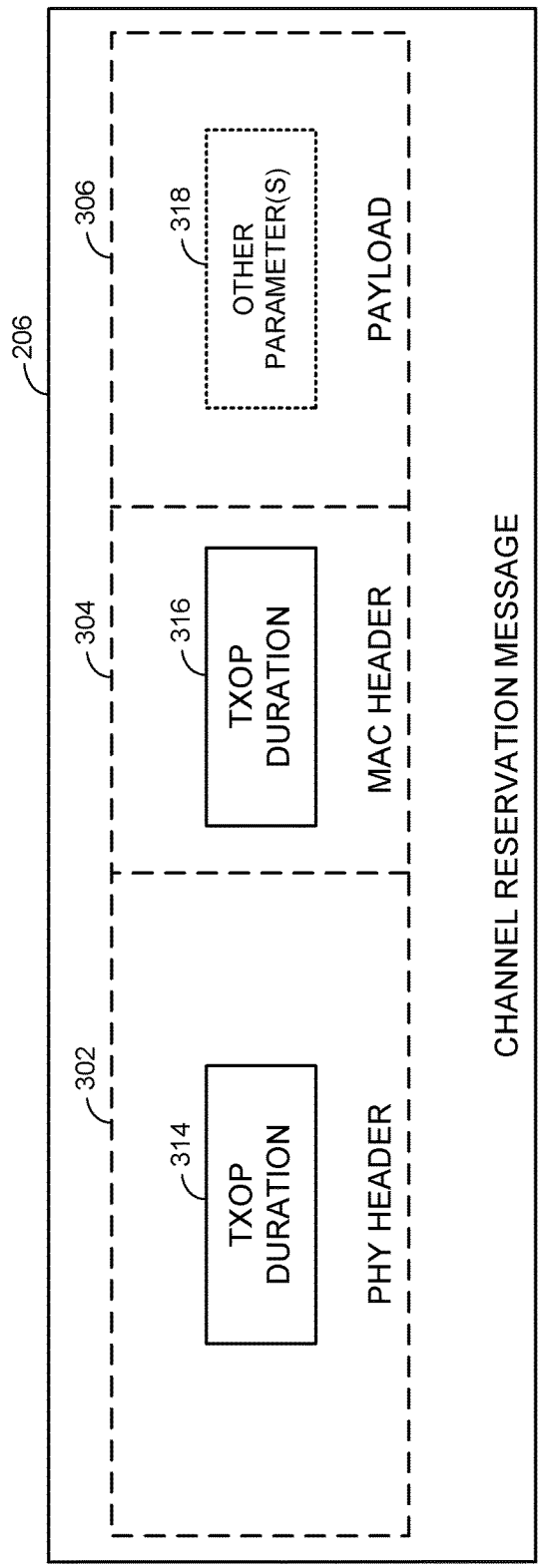
FIG. 3 illustrates an example channel reservation message for improved coordination with limited-functionality devices.

FIG. 3 illustrates an example channel reservation message for improved coordination with limited-functionality devices. In this example, the channel reservation message 206 includes a Physical (PHY) header portion 302, a Medium Access Control (MAC) header portion 304, and a payload portion 306 that includes various other parameters 318 for illustration purposes. The channel reservation message 206 may be generally defined by the competing RAT system 150 but transmitted by the access point 110 or some other device associated with the primary RAT system 100 to reserve the communication medium 140 for primary RAT operation.

As shown and discussed above, the MAC header portion 304 may be encoded with a transmission opportunity duration 316 that identifies the time period for which the communication medium 140 is being reserved. However, the MAC header portion 304 and hence the transmission opportunity duration 316 may not be readily decodable by certain devices within the primary RAT system 100. Accordingly, the PHY header portion 302—which may be more readily decodable by those devices—is also encoded with its own transmission opportunity duration 314. As an example, the transmission opportunity duration 314 may be encoded into one or more rate, length, or reserved bits in a Legacy Signal (L-SIG) field of a Physical Layer Convergence Protocol (PLCP) header.

In this way, limited functionality primary RAT devices of the primary RAT system 100 may still be able to determine the transmission opportunity duration from one portion of the channel reservation message 206 (the transmission opportunity duration 314) without impacting the ability of the conventionally-configured competing nodes 152 of the competing RAT system 150 to determine the transmission opportunity duration from another portion of the channel reservation message 206 (the transmission opportunity duration 316).

Figure 4:
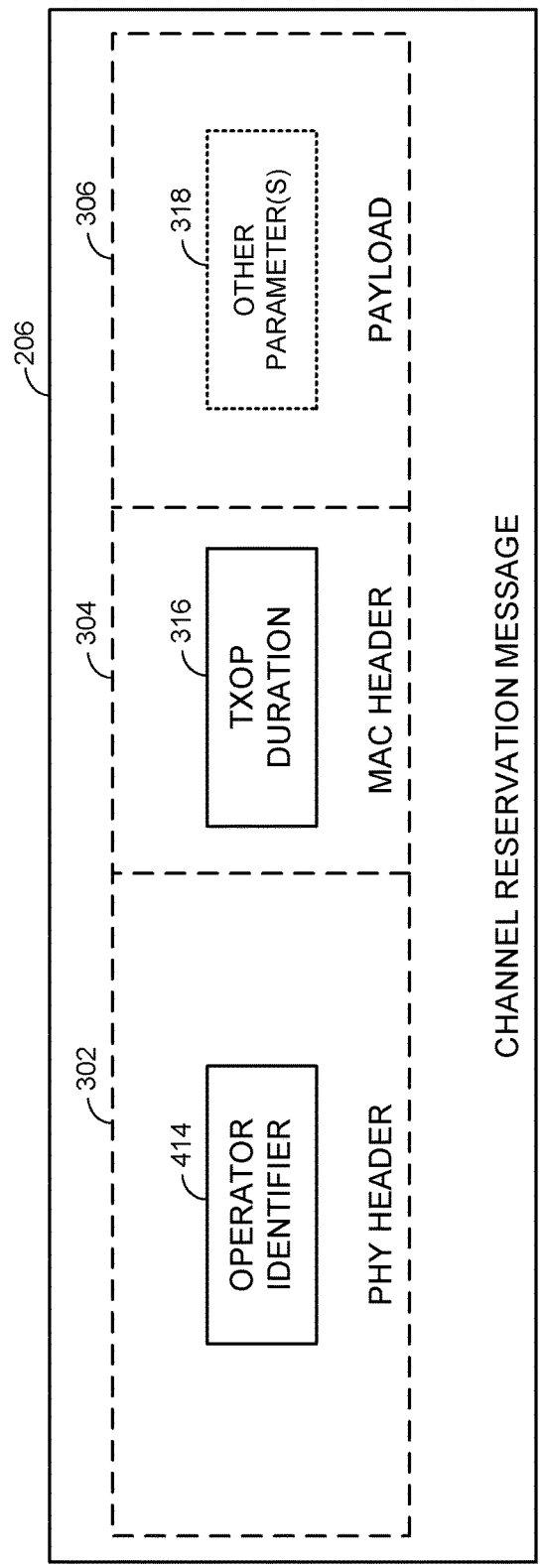
FIG. 4 illustrates another example channel reservation message for improved coordination with limited-functionality devices.

FIG. 4 illustrates another example channel reservation message for improved coordination with limited-functionality devices. As in the example of FIG. 3, the channel reservation message 206 here includes the PHY header portion 302, the MAC header portion 304, and the payload portion 306 that includes various other parameters 318 for illustration purposes.

The MAC header portion 304 is again encoded with the transmission opportunity duration 316. In addition, the PHY header portion 302 is encoded with an operator identifier 414 associated with the primary RAT system 100. As an example, the operator identifier 414 may correspond to a Public Land Mobile Network Identifier (PLMN ID) or the like.

By identifying the channel reservation message 206 as being associated with a particular primary RAT operator and doing so as part of the PHY header portion 302, other primary RAT devices belonging to the same operator—even those with only limited-functionality secondary-RAT transceiver capabilities—may identify and exclude the channel reservation message 206 from related MAC operations predicated on secondary RAT signaling. For example, LTE devices receiving a Wi-Fi CTS2S message flagged as being associated with LTE operation may refrain from backing off and instead continue to access to the communication medium 140 (thereby better facilitating "reuse 1"). By contrast, any device unaware of the operator identifier 414 would normally defer access to the communication medium 140 until the channel reservation expires. This allows the mixed-mode MAC scheme to operate more harmoniously and more efficiently, retaining the advantages of each RAT (e.g., the tight resource reuse provided by LTE and the medium sharing predicated on Wi-Fi signaling).

The operator identifier 414 may be coordinated among neighboring devices in various ways. For example, it may be set by a given operator and provided via backhaul signaling, such as in the form of an Operation & Maintenance (O&M) parameter in the configuration file of the access point 110. As another example, it may be calculated (e.g., as a hash function) based on a full identifier (e.g., the PLMN ID).

Figure 5:
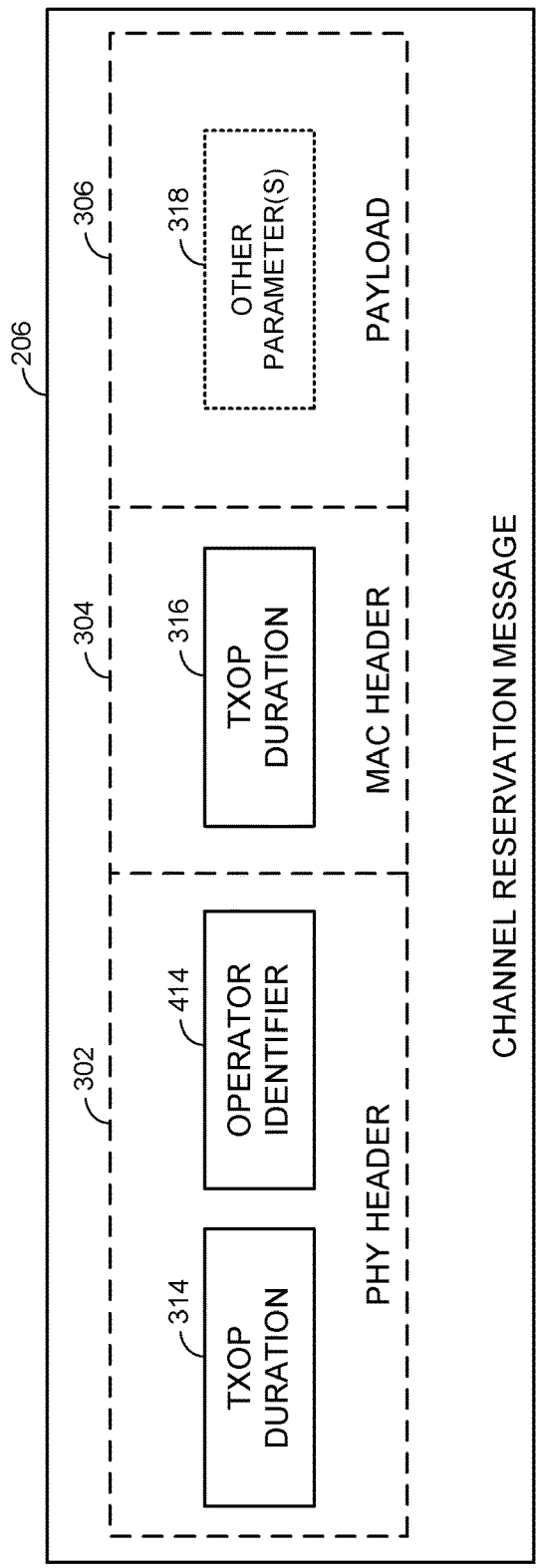
FIG. 5 illustrates another example channel reservation message for improved coordination with limited-functionality devices.

FIG. 5 illustrates another example channel reservation message for improved coordination with limited-functionality devices. As in the example of FIG. 3, the channel reservation message 206 here includes the PHY header portion 302, the MAC header portion 304, and the payload portion 306 that includes various other parameters 318 for illustration purposes.

The MAC header portion 304 is encoded with the transmission opportunity duration 316. In addition, the PHY header portion 302 is encoded with its own transmission opportunity duration 314 as well as the operator identifier 414 associated with the primary RAT system 100.

The transmission opportunity duration 314 and/or the operator identifier 414 may be encoded in the PHY header portion 302 of the channel reservation message 206 in different ways. For example, they may be encoded as new special-purpose identifiers, carved out of a previously unused or reserved set of bits, or correspond to a preexisting field or fields that are repurposed by way of a predetermined value. Several examples are provided below in the context of a PLCP Protocol Data Unit (PPDU) frame format for illustration purposes. It will be appreciated, however, that other formats of the channel reservation message 206 may be used and adapted in other applications as desired.

Figure 6:
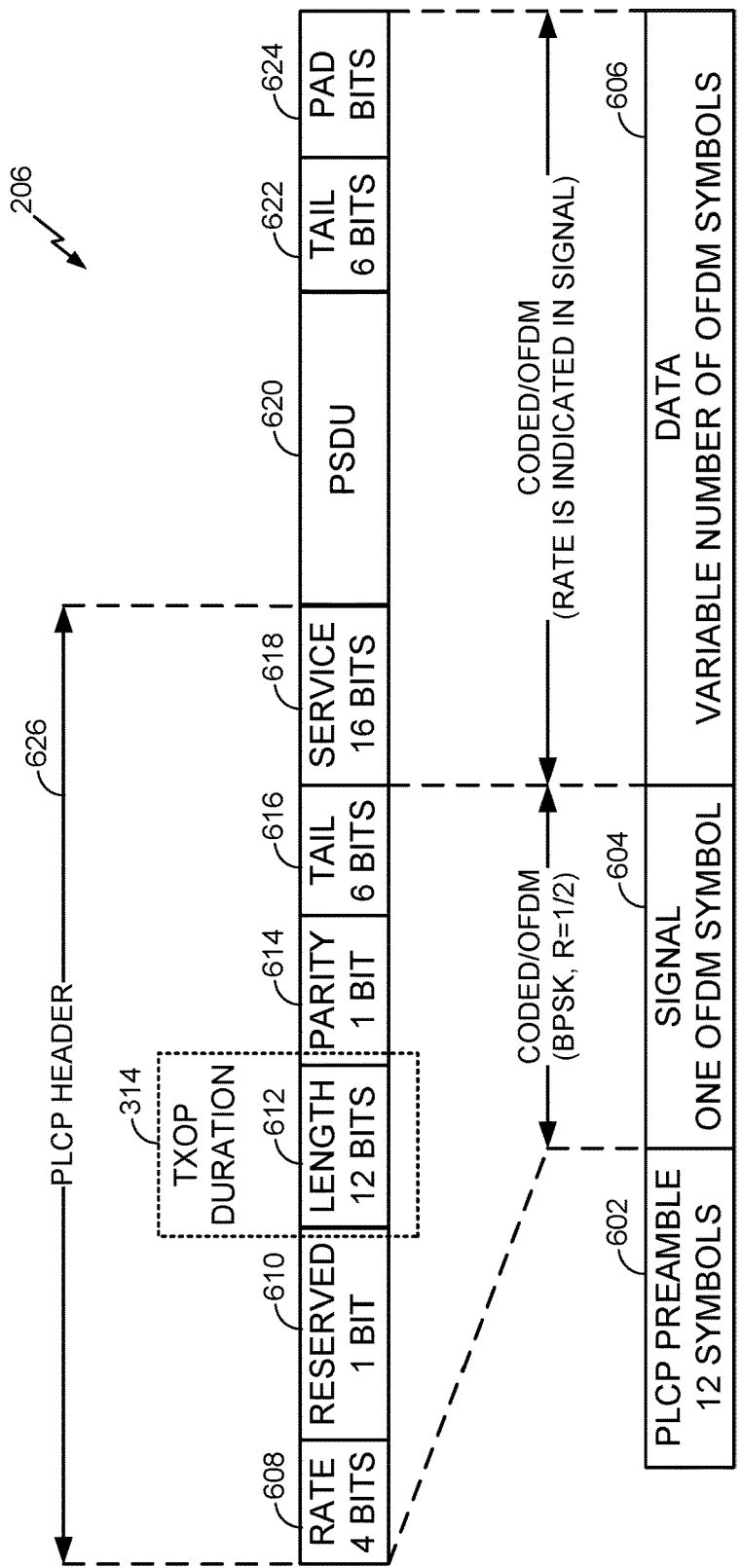
FIG. 6 illustrates an example channel reservation message adapted for improved coordination with limited-functionality devices.

FIG. 6 illustrates an example PPDU channel reservation message adapted for improved coordination with limited-functionality devices. As shown, the PPDU implementation of the channel reservation message 206 here generally includes a PLCP preamble field 602, a signal field 604, and a data field 606 composed of varying numbers of Orthogonal Frequency Division Multiplexed (OFDM) symbols, which are further divided in various sub-fields and associated bits, such as a rate field 608, a reserved field 610, a length field 612, a parity field 614, a tail field 616, a service field 618, a PLCP Service Data Unit (PSDU) field 620, another tail field 622, and a padding bits field 624. Together, the rate field 608, the reserved field 610, the length field 612, the parity field 614, the tail field 616, and the service field 618 form a PLCP header 626.

In relevant part, in this example the transmission opportunity duration 314 is encoded into one or more bits of the length field 612. For example, the access point 110 may select a duration for the channel reservation message 206 (e.g., by adding or removing bits in the padding bits field 624) based on the transmission opportunity duration 314 and set the length field 612 accordingly. Because the number of padding bits is effectively arbitrary, the length of the channel reservation message 206 may be adjusted to correspond to or otherwise map to different predetermined values of the transmission opportunity duration 314 without substantially impacting operation of the channel reservation message 206. A primary RAT device decoding the length field 612 may therefore be able to identify the separate transmission opportunity duration 314 itself from the length of the channel reservation message 206.

Returning to the PPDU implementation of the channel reservation message 206 in FIG. 6, the duration of the variable-length PSDU field 620 may be derived based on the following equation:

$$T_{SYM} \times \text{Ceil}[(16+\text{LENGTH}\times 8+6)/N_{DBPS}] \qquad \text{(Eq. 1)}$$

Here, LENGTH corresponds to the parameter in the length field 612, $N_{DBPS}$ is given by the RATE parameter in the rate field 608, and $T_{SYM}$=4 µs for a long guard interval. The resolution of the PSDU duration is therefore in units of one OFDM symbol or 4 µs, and with a maximum physical duration of a packet being limited to 5.484 ms, hundreds of different transmission opportunity duration values may be indicated in this manner.

For improved efficiency, however, the range of lengths for the channel reservation message 206 and the corresponding values employed in the length field 612 may be restricted to a smaller subset. For example, the subset may be limited to constrain the length of the channel reservation message 206 to less than about 6% of the maximum value of the transmission opportunity duration 314 being conveyed (e.g., less than 600 µs for the channel reservation message 206 to convey a maximum 10 ms transmission opportunity duration 314). The length of the channel reservation message 206 may therefore be set to a scaled duration of the transmission opportunity duration 314 (e.g., 1:20) or mapped in some other condensed manner. While this may limit the number and resolution of the different transmission opportunity duration 314 values that may be conveyed, it may help to reduce the overhead associated with a long channel reservation message 206. It may not be desirable to send a channel reservation message 206 with a duration on the order of 5 ms for a transmission opportunity duration 314 on the order of 10 ms, for example, since the overhead and resource wastage for all RATs would be relatively high.

Figure 7:
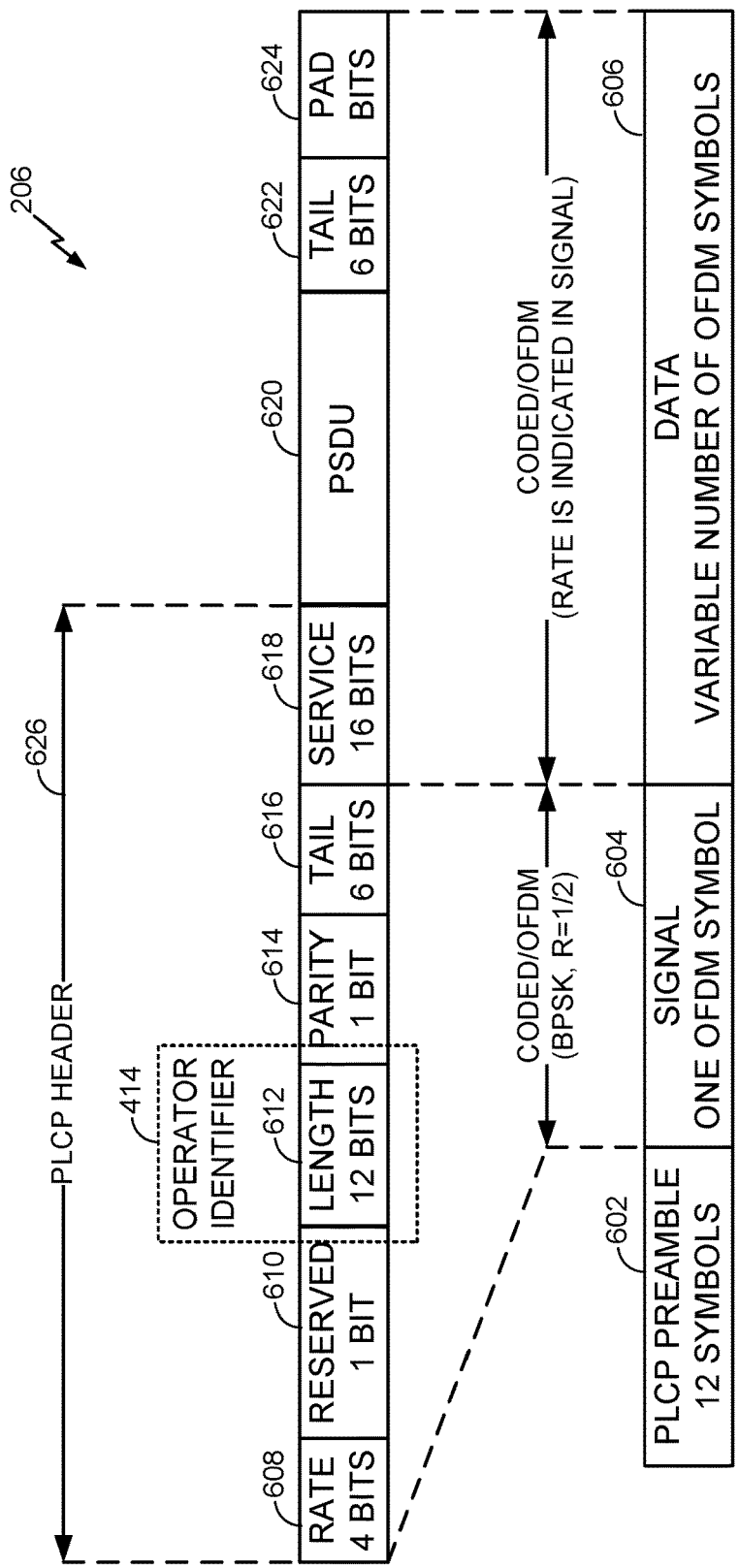
FIG. 7 illustrates another example channel reservation message adapted for improved coordination with limited-functionality devices.

FIG. 7 illustrates another example PPDU channel reservation message adapted for improved coordination with limited-functionality devices. As in the example of FIG. 6, the PPDU implementation of the channel reservation message 206 here again generally includes the PLCP preamble field 602, the signal field 604, and the data field 606, as well as the rate field 608, the reserved field 610, the length field 612, the parity field 614, the tail field 616, the service field 618, the PSDU field 620, the other tail field 622, and the padding bits field 624, with the rate field 608, the reserved field 610, the length field 612, the parity field 614, the tail field 616, and the service field 618 forming the PLCP header 626.

In relevant part, in this example the operator identifier 414 is encoded into one or more bits of the length field 612. For example, the access point 110 may select a duration for the channel reservation message 206 based on the operator identifier 414, and set the length field 612 accordingly. The length of the channel reservation message 206 may be adjusted to correspond to or otherwise map to different predetermined values of the operator identifier 414 without substantially impacting operation of the channel reservation message 206. A primary RAT device decoding the length field 612 may therefore be able to identify the operator identifier 414 from the length of the channel reservation message 206.

Again, for improved efficiency, the range of lengths for the channel reservation message 206 and the corresponding values employed in the length field 612 may be restricted to a smaller subset.

Figure 8:
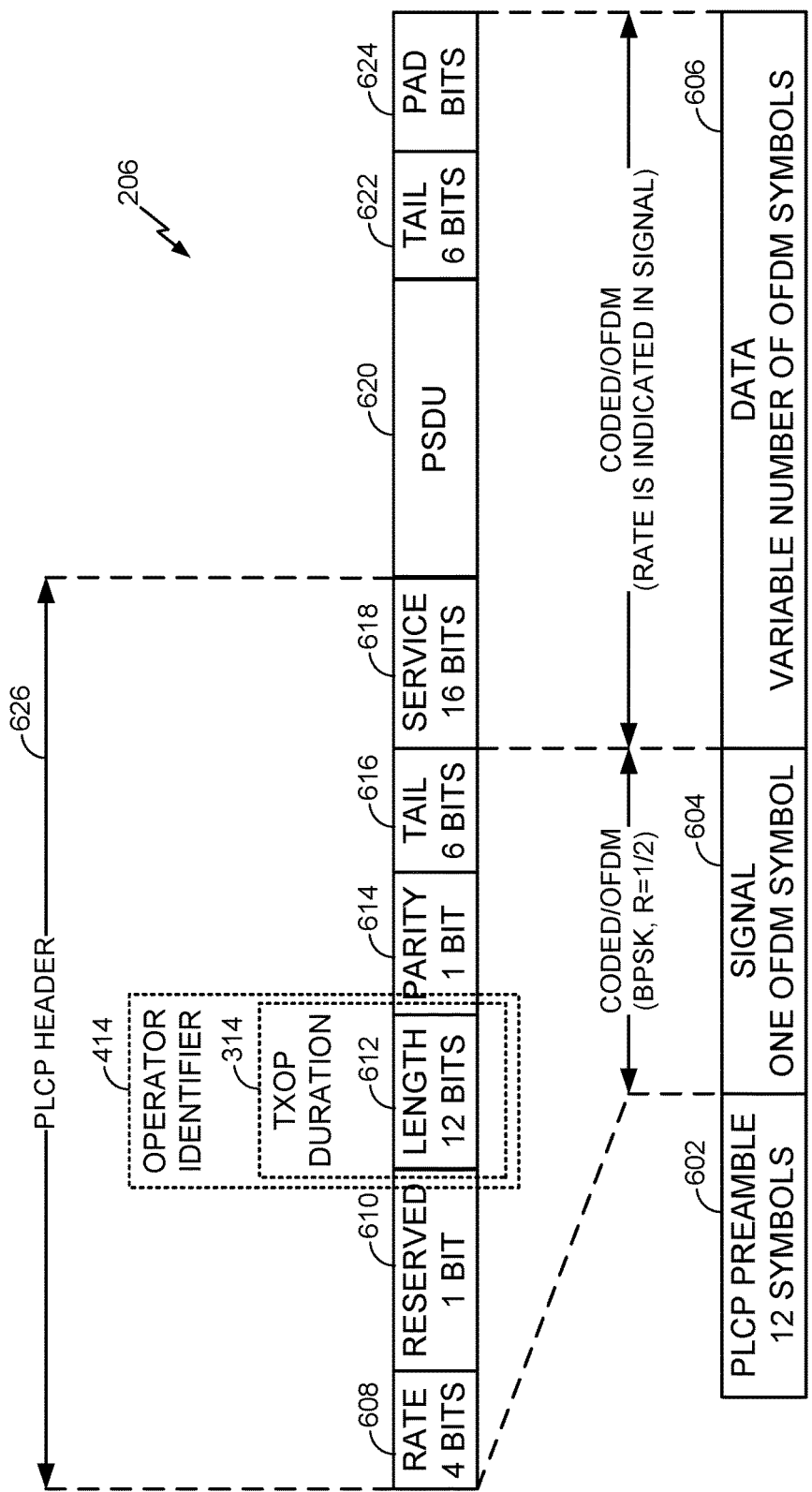
FIG. 8 illustrates another example channel reservation message adapted for improved coordination with limited-functionality devices.

FIG. 8 illustrates another example PPDU channel reservation message adapted for improved coordination with limited-functionality devices. As in the example of FIG. 6, the PPDU implementation of the channel reservation message 206 here again generally includes the PLCP preamble field 602, the signal field 604, and the data field 606, as well as the rate field 608, the reserved field 610, the length field 612, the parity field 614, the tail field 616, the service field 618, the PSDU field 620, the other tail field 622, and the padding bits field 624, with the rate field 608, the reserved field 610, the length field 612, the parity field 614, the tail field 616, and the service field 618 forming the PLCP header 626.

In relevant part, in this example both the transmission opportunity duration 314 and the operator identifier 414 are encoded into one or more bits of the length field 612. For example, the access point 110 may select a duration for the channel reservation message 206 based on the transmission opportunity duration 314 and the operator identifier 414, and set the length field 612 accordingly. The length of the channel reservation message 206 may be adjusted to correspond to or otherwise map to different pairs of predetermined values of the transmission opportunity duration 314 and the operator identifier 414 without substantially impacting operation of the channel reservation message 206. A primary RAT device decoding the length field 612 may therefore be able to identify the transmission opportunity duration 314/operator identifier 414 pair from the length of the channel reservation message 206.

Again, for improved efficiency, the range of lengths for the channel reservation message 206 and the corresponding values employed in the length field 612 may be restricted to a smaller subset.

Figure 9:
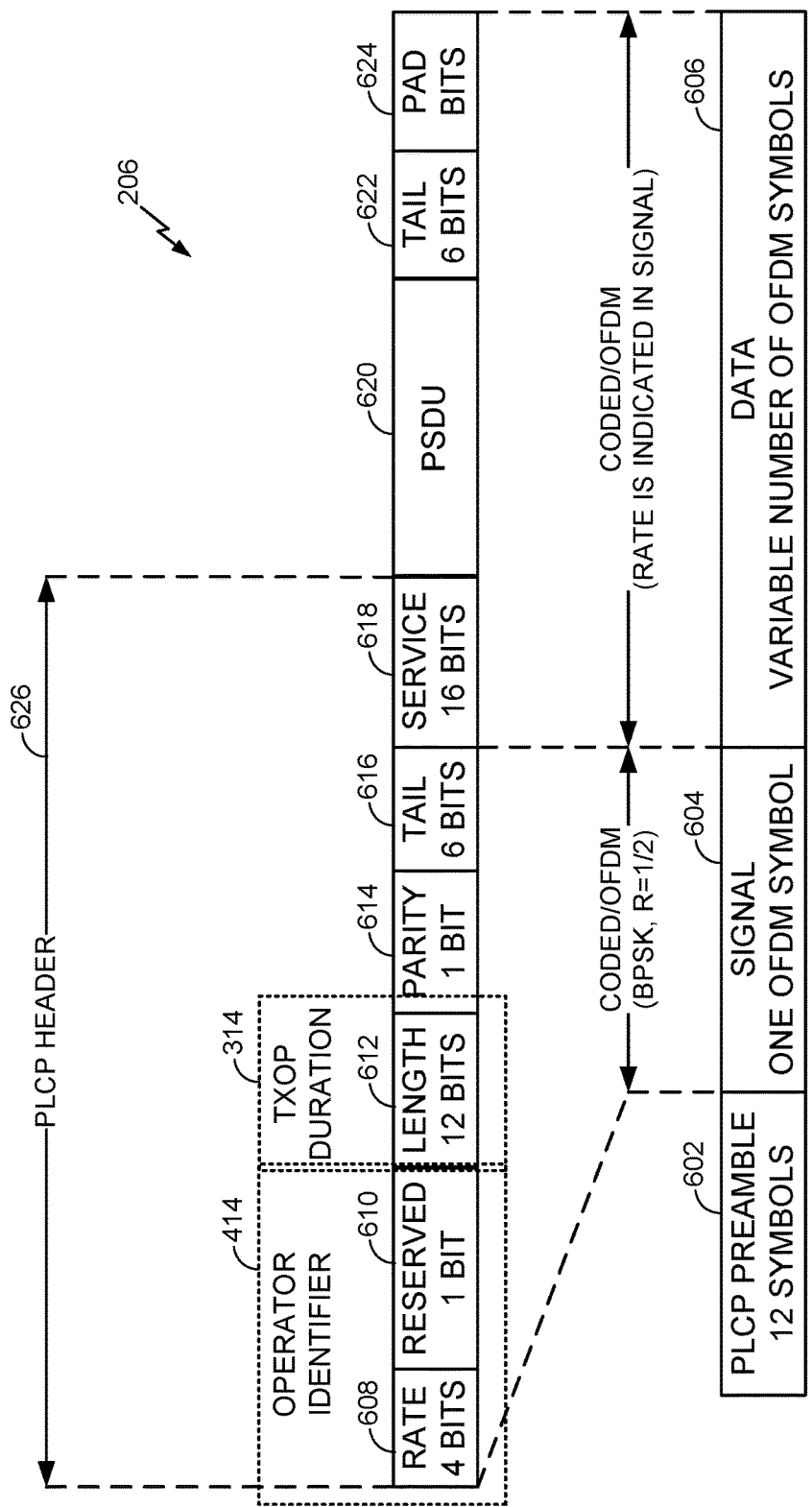
FIG. 9 illustrates another example channel reservation message adapted for improved coordination with limited-functionality devices.

FIG. 9 illustrates another example PPDU channel reservation message adapted for improved coordination with limited-functionality devices. As in the example of FIG. 6, the PPDU implementation of the channel reservation message 206 here again generally includes the PLCP preamble field 602, the signal field 604, and the data field 606, as well as the rate field 608, the reserved field 610, the length field 612, the parity field 614, the tail field 616, the service field 618, the PSDU field 620, the other tail field 622, and the padding bits field 624, with the rate field 608, the reserved field 610, the length field 612, the parity field 614, the tail field 616, and the service field 618 forming the PLCP header 626.

In relevant part, in this example the operator identifier 414 is encoded into one or more bits of the rate field 608 and/or the reserved field 610, while the transmission opportunity duration 314 is encoded into one or more bits of the length field 612. For example, the access point 110 may select a transmission rate for the channel reservation message 206 based on the operator identifier 414 and set the rate field 608 accordingly. The access point 110 may then select a duration for the channel reservation message 206 based on the transmission opportunity duration 314 and set the length field 612 accordingly. As discussed above, the length field 612 may also be a function of the selected transmission rate. The reserved field 610 may also be used in conjunction with the rate field 608 to convey the operator identifier 414 (e.g., when additional bits are needed).

It will be appreciated that in other designs, the transmission opportunity duration 314 may be encoded into one or more bits of the rate field 608 and/or the reserved field 610, while the operator identifier 414 is encoded into one or more bits of the length field 612.

In some designs or scenarios, it may be advantageous to utilize two separate channel reservation messages 206. For example, the access point 110 may transmit a first channel reservation message 206 including the operator identifier 414 followed by a second (extension) channel reservation message 206 including the transmission opportunity duration 314. By spreading the operator identifier 414 and the transmission opportunity duration 314 over two channel reservation messages 206, modification of the rate field 608 may be avoided, which may permit one or both of the channel reservation messages 206 to be transmitted at a relatively low transmission rate with increased range and therefore effectiveness.

Figure 10:
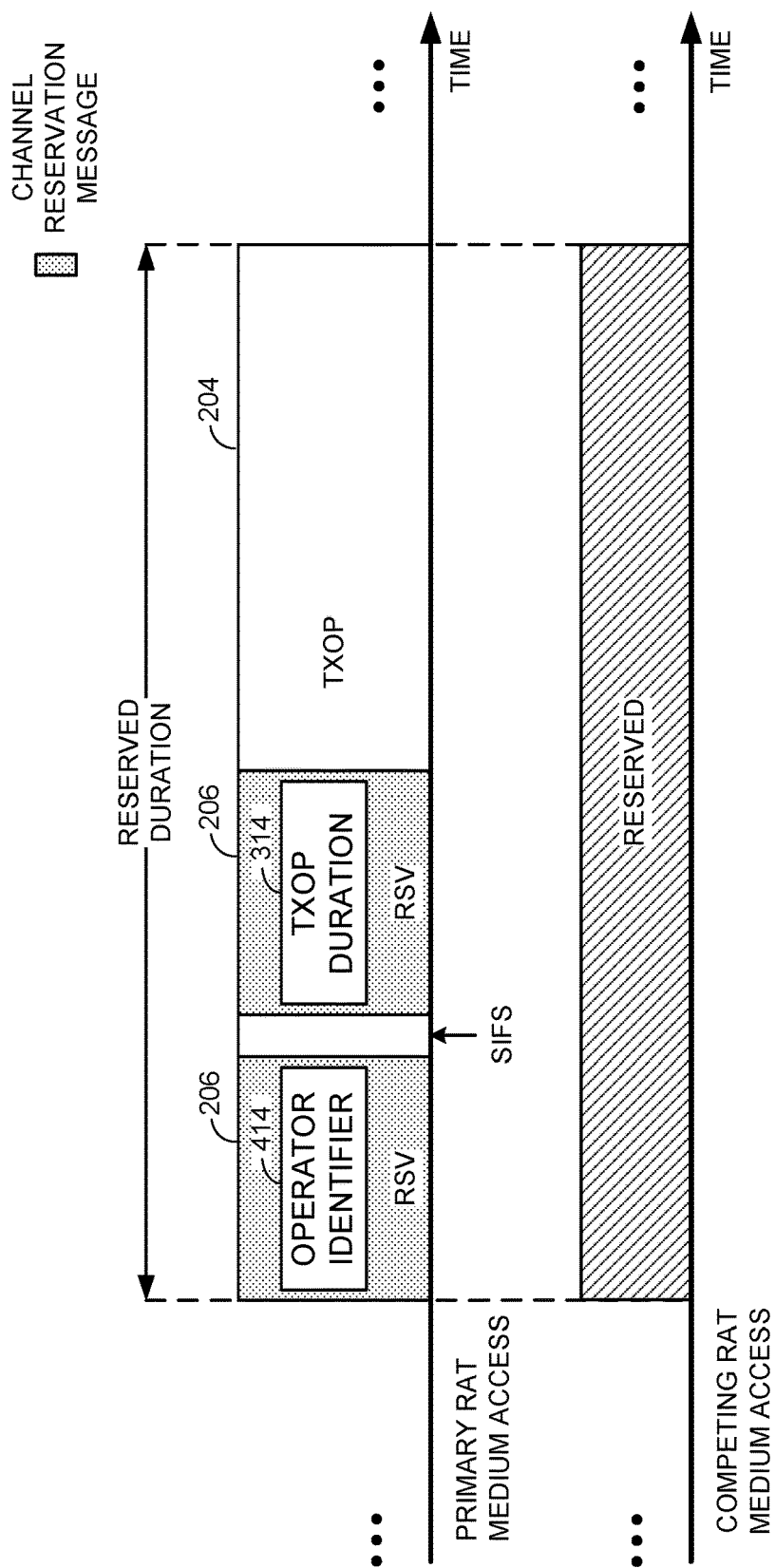
FIG. 10 is a timing diagram illustrating an example dual channel reservation message transmission scheme.

FIG. 10 is a timing diagram illustrating an example dual channel reservation message transmission scheme. As shown, two instances of the channel reservation message 206 are transmitted to secure the communication medium 140 for the transmission opportunity (TXOP) 204.

The first channel reservation message 206 may include the operator identifier 414 as in the example of FIG. 4 discussed in more detail above, as well as other relevant elements omitted for illustration purposes (e.g., the transmission opportunity duration 316 in the MAC header portion 304, etc.). By including the operator identifier 414, other primary RAT devices belonging to the same operator—even those with only limited-functionality secondary-RAT transceiver capabilities—may again identify the first channel reservation message 206 as being associated with a particular primary RAT operator. Further, as discussed above with reference to FIG. 7, for example, the operator identifier 414 may be adequately conveyed without having to modify the transmission rate of the first channel reservation message 206 (e.g., via the length field 612). This allows the first channel reservation message 206 to be transmitted at any transmission rate, including the lowest available transmission rate for increased range and therefore effectiveness.

The second channel reservation message 206 may supplement the first channel reservation message 206 by including the transmission opportunity duration 314 as in the example of FIG. 3 discussed in more detail above, as well as other relevant elements omitted for illustration purposes (e.g., the transmission opportunity duration 316 in the MAC header portion 304, etc.). While limited-functionality devices may not be able to determine the duration of the transmission opportunity 208 from the first channel reservation message 206 alone, these devices may be able to do so from the transmission opportunity duration 314 of the second channel reservation message 206. Further, as discussed above with reference to FIG. 6, for example, the transmission opportunity duration 314 may also be adequately conveyed without having to modify the transmission rate of the second channel reservation message 206 (e.g., via the length field 612). This again allows the second channel reservation message 206 to be transmitted at any transmission rate, including the lowest available transmission rate for increased range and therefore effectiveness. However, because the first channel reservation message 206 may have already been transmitted at the lowest available transmission rate and the communication medium 140 is therefore already reserved for the remainder of the transmission opportunity 208, the second channel reservation message 206 may be transmitted at a different transmission rate as well (e.g., to utilize the rate field 608 for encoding the transmission opportunity duration 314 or other reasons).

The access point 110 may indicate that the second channel reservation message 206 belongs to the same operator as the first channel reservation message 206 in various ways. For example, the first and second channel reservation messages 206 may be spaced apart from one another by a predetermined period of time (e.g., a 16 μs Short Interframe Space (SIFS)) that is indicative of a correlation between the first and second channel reservation messages 206.

Figure 11:
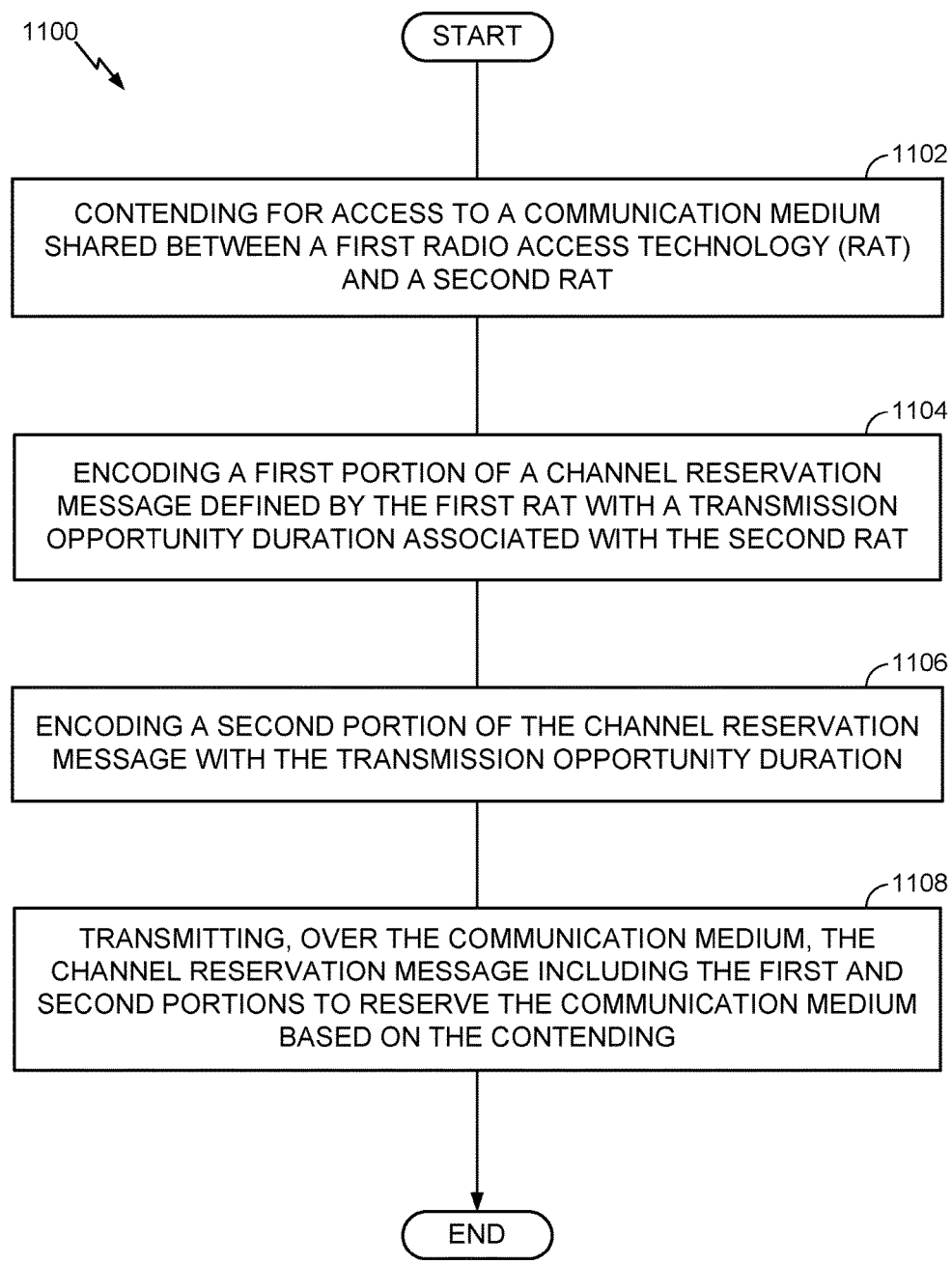
FIG. 11 is a flow diagram illustrating an example method of communication in accordance with the techniques described herein.

FIG. 11 is a flow diagram illustrating an example method of communication in accordance with the techniques described above. The method 1100 may be performed, for example, by an access point or an access terminal (e.g., the access point 110 or the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point or the access terminal may contend for access to a communication medium shared between a first RAT and a second RAT (block 1102). The access point or the access terminal may encode a first portion of a channel reservation message defined by the first RAT with a transmission opportunity duration associated with the second RAT (block 1104) and also encode a second portion of the channel reservation message with the transmission opportunity duration (block 1106). The access point or the access terminal may then transmit, over the communication medium, the channel reservation message including the first and second portions to reserve the communication medium based on the contending (block 1108).

As discussed in more detail above, the second portion may correspond, for example, to a Physical (PHY) header of the channel reservation message. Meanwhile, the first portion may correspond, for example, to a Medium Access Control (MAC) header of the channel reservation message. The encoding of the second portion (block 1106) may comprise, for example, encoding one or more rate, length, or reserved bits in an L-SIG field of a PLCP header.

In some designs, the access point or the access terminal may also encode the second portion of the channel reservation message with an operator identifier associated with the first RAT. As an example, the operator identifier may correspond to a PLMN ID. This encoding of the second portion may comprise, for example, selecting a duration for the channel reservation message based on the transmission opportunity duration, the operator identifier, or a combination thereof; and setting a length field of the channel reservation message based on the selected duration. The selecting may be further based on a predetermined set of one or more values of the length field that identify an association with the second RAT. In addition or as an alternative, the encoding of the second portion may comprise, for example, selecting a transmission rate for the channel reservation message based on one of the transmission opportunity duration or the operator identifier; setting a rate field of the channel reservation message based on the selected transmission rate; selecting a duration for the channel reservation message based on the other of the transmission opportunity duration or the operator identifier; and setting a length field of the channel reservation message based on the selected duration. Here, the encoding of the second portion may also comprise setting a reserved field of the channel reservation message based on the one of the transmission opportunity duration or the operator identifier.

In some designs, the access point or the access terminal may also transmit, over the communication medium, a second channel reservation message prior to the first channel reservation message, with the second channel reservation message comprising an operator identifier associated with the first RAT. The first and second channel reservation messages may be spaced apart from one another by a predetermined period of time that is indicative of a correlation between the first and second channel reservation messages. Here, the access point or the access terminal may also encode a first portion of the second channel reservation message corresponding to the first portion of the first channel reservation message with the transmission opportunity duration, and encode a second portion of the second channel reservation message corresponding to the second portion of the first channel reservation message with the operator identifier. This encoding of the second portion of the second channel reservation message may comprise, for example, encoding one or more rate, length, or reserved bits with the transmission opportunity duration. The first and second channel reservation messages may be transmitted with different transmission rates.

As an example, the channel reservation message may comprise a CTS2S message defined by the first RAT, an RTS message defined by the first RAT, or a CTS message defined by the first RAT.

For generality, the access point 110 and the access terminal 120 are shown in FIG. 1 only in relevant part as including the channel reservation manager 112 and the channel reservation manager 122, respectively. It will be appreciated, however, that the access point 110 and the access terminal 120 may be configured in various ways to provide or otherwise support the channel reservation techniques discussed herein.

Figure 12:
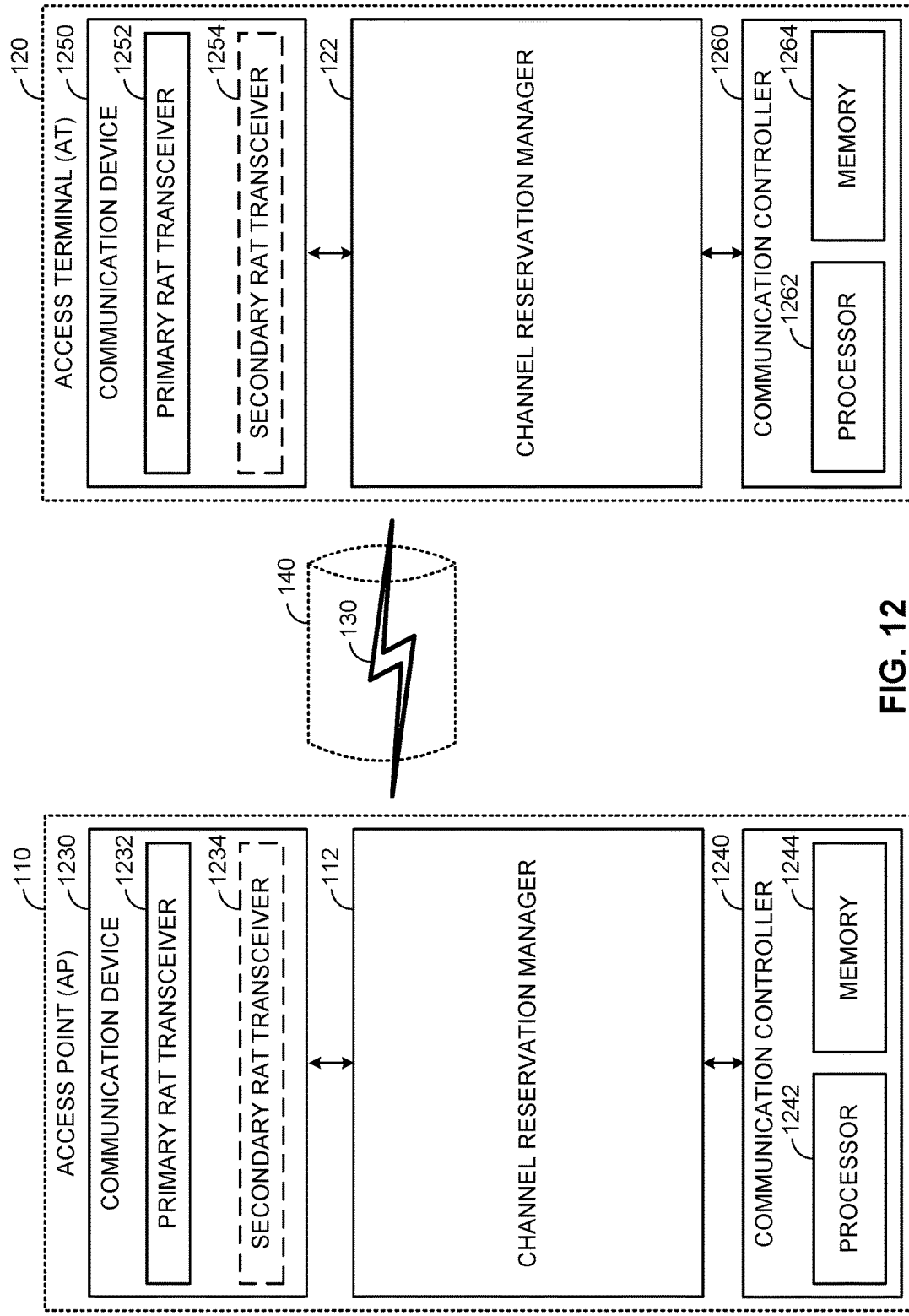
FIG. 12 is a device-level diagram illustrating example components of an access point and an access terminal in more detail.

FIG. 12 is a device-level diagram illustrating example components of the access point 110 and the access terminal 120 of the primary RAT system 100 in more detail. As shown, the access point 110 and the access terminal 120 may each generally include a wireless communication device (e.g., represented by the communication devices 1230 and 1250) for communicating with other wireless nodes via at least one designated RAT. The communication devices 1230 and 1250 may be variously configured for transmitting and encoding signals, and, conversely, for receiving and decoding signals in accordance with the designated RAT (e.g., messages, indications, information, pilots, and so on).

The communication devices 1230 and 1250 may include, for example, one or more transceivers, such as respective primary RAT transceivers 1232 and 1252, and, in some designs, (optional) co-located secondary RAT transceivers 1234 and 1254, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (e.g., represented by the communication controllers 1240 and 1260) for controlling operation of their respective communication devices 1230 and 1250 (e.g., directing, modifying, enabling, disabling, etc.). The communication controllers 1240 and 1260 may include one or more processors 1242 and 1262, and one or more memories 1244 and 1264 coupled to the processors 1242 and 1262, respectively. The memories 1244 and 1264 may be configured to store data, instructions, or a combination thereof, either as on-board cache memory, as separate components, a combination, etc. The processors 1242 and 1262 and the memories 1244 and 1264 may be standalone communication components or may be part of the respective host system functionality of the access point 110 and the access terminal 120.

It will be appreciated that the channel reservation manager 112 and the channel reservation manager 122 may be implemented in different ways. In some designs, some or all of the functionality associated therewith may be implemented by or otherwise at the direction of at least one processor (e.g., one or more of the processors 1242 and/or one or more of the processors 1262) and at least one memory (e.g., one or more of the memories 1244 and/or one or more of the memories 1264). In other designs, some or all of the functionality associated therewith may be implemented as a series of interrelated functional modules.

Figure 13:
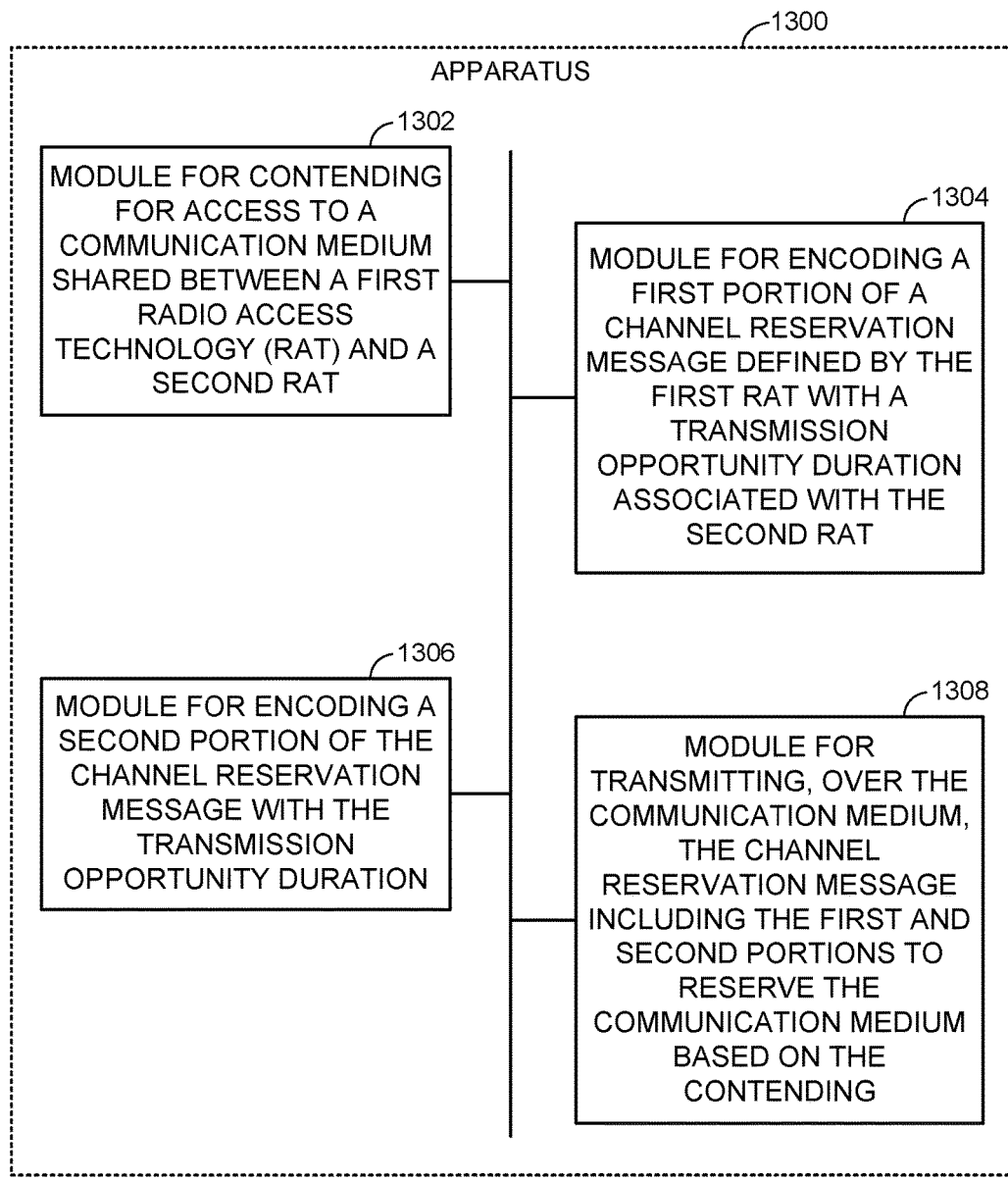
FIG. 13 illustrates an example apparatus represented as a series of interrelated functional modules.

FIG. 13 illustrates an example apparatus for implementing the channel reservation manager 112 and the channel reservation manager 122 represented as a series of interrelated functional modules. In the illustrated example, the apparatus 1300 includes a module for contending 1302, a module for encoding 1304, a module for encoding 1306, and a module transmitting 1308. The module for contending 1302 may be configured to contend for access to a communication medium shared between a first RAT and a second RAT. The module for encoding 1304 may be configured to encode a first portion of a channel reservation message defined by the first RAT with a transmission opportunity duration associated with the second RAT. The module for encoding 1306 may be configured to encode a second portion of the channel reservation message with the transmission opportunity duration. The module for transmitting 1308 may be configured to transmit, over the communication medium, the channel reservation message including the first and second portions to reserve the communication medium based on the contending.

The functionality of the modules of FIG. 13 may be implemented in various ways consistent with the teachings herein. In some designs, the functionality of these modules may be implemented as one or more electrical or electronic components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components/functions represented by FIG. 11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or AB, or AC, or ABC, or AA, or BB, or CC, or ABBC, or BCCC, or AACC, and so on. In addition, the articles "a" and "an" as used in this application and the appended claims should generally be construed to mean "one or more" unless specified otherwise or clear from the context to be directed to a singular form.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, phase change memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory). Software shall be construed broadly to mean instructions, data, or any combination thereof, whether referred to as software, firmware, middleware, microcode, hardware description language, or otherwise.

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
contending for access to a communication medium shared between a competing Radio Access Technology (RAT) and a primary RAT;
encoding a first portion of a channel reservation message defined by the competing RAT with a transmission opportunity duration associated with the primary RAT;
encoding a second portion of the channel reservation message with the transmission opportunity duration;
encoding the second portion of the channel reservation message with an operator identifier associated with the primary RAT; and
transmitting, over the communication medium, the channel reservation message including the first and second portions to reserve the communication medium based on the contending,
wherein the transmission opportunity duration in the first portion is decodable by devices of the competing RAT but is not decodable by devices of the primary RAT,
wherein the transmission opportunity duration in the second portion is decodable by the devices of the competing RAT and by the devices of the primary RAT, and
wherein the encoding of the second portion comprises:
selecting a duration for the channel reservation message based on the transmission opportunity duration, the operator identifier, or a combination thereof; and
setting a length field of the channel reservation message based on the selected duration.

2. The method of claim 1, wherein the second portion corresponds to a Physical (PHY) header of the channel reservation message.

3. The method of claim 2, wherein the first portion corresponds to a Medium Access Control (MAC) header of the channel reservation message.

4. The method of claim 2, wherein the encoding of the second portion comprises encoding one or more rate, length, or reserved bits in a Legacy Signal (L-SIG) field of a Physical Layer Convergence Protocol (PLCP) header.

5. The method of claim 1, wherein the operator identifier corresponds to a Public Land Mobile Network Identifier (PLMN ID).

6. The method of claim 1, wherein the selecting is further based on a predetermined set of one or more values of the length field that identify an association with the primary RAT.

7. The method of claim 1, wherein the encoding of the second portion comprises:
selecting a transmission rate for the channel reservation message based on one of the transmission opportunity duration or the operator identifier;
setting a rate field of the channel reservation message based on the selected transmission rate;
selecting the duration for the channel reservation message based on the other of the transmission opportunity duration or the operator identifier; and
setting the length field of the channel reservation message based on the selected duration.

8. The method of claim 7, wherein the encoding of the second portion further comprises setting a reserved field of the channel reservation message based on the one of the transmission opportunity duration or the operator identifier.

9. The method of claim 1, wherein the channel reservation message comprises a Clear-to-Send-to-Self (CTS2S) message defined by the competing RAT, a Request-to-Send (RTS) message defined by the competing RAT, or a Clear-to-Send (CTS) message defined by the competing RAT.

10. The method of claim 1, wherein the communication medium corresponds to an unlicensed radio frequency band.

11. The method of claim 1, wherein:
the competing RAT comprises Wi-Fi technology; and
the primary RAT comprises Long Term Evolution (LTE) technology.

12. The method of claim 1, wherein the devices of the primary RAT ignore any channel reservation message defined by the primary RAT.

13. A communication apparatus, comprising:
at least one processor;
at least one memory, the at least one processor and the at least one memory being configured to:
contend for access to a communication medium shared between a competing Radio Access Technology (RAT) and a primary RAT,
encode a first portion of a channel reservation message defined by the competing RAT with a transmission opportunity duration associated with the primary RAT,
encode the second portion of the channel reservation message with an operator identifier associated with the primary RAT, and
encode a second portion of the channel reservation message with the transmission opportunity duration; and
a transceiver configured to transmit, over the communication medium, the channel reservation message including the first and second portions to reserve the communication medium based on the contending,
wherein the transmission opportunity duration in the first portion is decodable by devices of the competing RAT but is not decodable by devices of the primary RAT,
wherein the transmission opportunity duration in the second portion is decodable by the devices of the competing RAT and by the devices of the primary RAT, and
wherein the at least one processor and the at least one memory are configured to encode the second portion by:
selecting a duration for the channel reservation message based on the transmission opportunity duration, the operator identifier, or a combination thereof; and
setting a length field of the channel reservation message based on the selected duration.

14. The apparatus of claim 13, wherein the second portion corresponds to a Physical (PHY) header of the channel reservation message.

15. The apparatus of claim 14, wherein the first portion corresponds to a Medium Access Control (MAC) header of the channel reservation message.

16. The apparatus of claim 14, wherein the at least one processor and the at least one memory are configured to encode the second portion by encoding one or more rate, length, or reserved bits in a Legacy Signal (L-SIG) field of a Physical Layer Convergence Protocol (PLCP) header.

17. The apparatus of claim 13, wherein the at least one processor and the at least one memory are configured to encode the second portion by:
selecting a transmission rate for the channel reservation message based on one of the transmission opportunity duration or the operator identifier;
setting a rate field of the channel reservation message based on the selected transmission rate;
selecting the duration for the channel reservation message based on the other of the transmission opportunity duration or the operator identifier; and
setting the length field of the channel reservation message based on the selected duration.

18. The apparatus of claim 13, wherein the devices of the primary RAT ignore any channel reservation message defined by the primary RAT.

19. The apparatus of claim 13, wherein the at least one processor and the at least one memory are configured to select the duration for the channel message further based on a predetermined set of one or more values of the length field that identify an association with the primary RAT.

20. The apparatus of claim 13, wherein the channel reservation message comprises a Clear-to-Send-to-Self (CTS2S) message defined by the competing RAT, a Request-to-Send (RTS) message defined by the competing RAT, or a Clear-to-Send (CTS) message defined by the competing RAT.

21. The apparatus of claim 13, wherein the communication medium corresponds to an unlicensed radio frequency band.

22. A communication apparatus, comprising:
means for contending for access to a communication medium shared between a competing Radio Access Technology (RAT) and a primary RAT;
means for encoding a first portion of a channel reservation message defined by the competing RAT with a transmission opportunity duration associated with the primary RAT;

means for encoding a second portion of the channel reservation message with the transmission opportunity duration;

means for encoding the second portion of the channel reservation message with an operator identifier associated with the primary RAT; and means for transmitting, over the communication medium, the channel reservation message including the first and second portions to reserve the communication medium based on the contending, wherein the transmission opportunity duration in the first portion is decodable by devices of the competing RAT but is not decodable by devices of the primary RAT, wherein the transmission opportunity duration in the second portion is decodable by the devices of the competing RAT and by the devices of the primary RAT, and wherein the means for encoding of the second portion comprises:

selects a duration for the channel reservation message based on the transmission opportunity duration, the operator identifier, or a combination thereof, and sets a length field of the channel reservation message based on the selected duration.

23. The apparatus of claim 22, wherein the devices of the primary RAT ignore any channel reservation message defined by the primary RAT.

24. The apparatus of claim 17, the at least one processor and the at least one memory are further configured to encode the second portion by setting a reserved field of the channel reservation message based on the one of the transmission opportunity duration or the operator identifier.

25. The apparatus of claim 22,
wherein the second portion corresponds to a Physical (PHY) header of the channel reservation message, and
wherein the first portion corresponds to a Medium Access Control (MAC) header of the channel reservation message.

26. The apparatus of claim 22, wherein the means for encoding the second portion encodes one or more rate, length, or reserved bits in a Legacy Signal (L-SIG) field of a Physical Layer Convergence Protocol (PLCP) header.

27. The apparatus of claim 22, wherein the means for selecting the duration selects the duration for the channel reservation message further based on a predetermined set of one or more values of the length field that identify an association with the primary RAT.

28. The apparatus of claim 22, wherein the means for encoding the second portion
selects a transmission rate for the channel reservation message based on one of the transmission opportunity duration or the operator identifier,
sets a rate field of the channel reservation message based on the selected transmission rate,
selecting the duration for the channel reservation message based on the other of the transmission opportunity duration or the operator identifier, and
setting the length field of the channel reservation message based on the selected duration.

29. A non-transitory computer-readable medium comprising code, which, when executed by at least one processor, causes the at least one processor to perform operations for communication, the non-transitory computer-readable medium comprising:
code for contending for access to a communication medium shared between a competing Radio Access Technology (RAT) and a primary RAT;
code for encoding a first portion of a channel reservation message defined by the competing RAT with a transmission opportunity duration associated with the primary RAT;
code for encoding a second portion of the channel reservation message with the transmission opportunity duration;
code for encoding the second portion of the channel reservation message with an operator identifier associated with the primary RAT; and
code for transmitting, over the communication medium, the channel reservation message including the first and second portions to reserve the communication medium based on the contending,
wherein the transmission opportunity duration in the first portion is decodable by devices of the competing RAT but is not decodable by devices of the primary RAT,
wherein the transmission opportunity duration in the second portion is decodable by the devices of the competing RAT and by the devices of the primary RAT, and
wherein the code for encoding of the second portion comprises:
code for selecting a duration for the channel reservation message based on the transmission opportunity duration, the operator identifier, or a combination thereof; and
code for setting a length field of the channel reservation message based on the selected duration.

30. The non-transitory computer-readable medium of claim 29, wherein the devices of the primary RAT ignore any channel reservation message defined by the primary RAT.

31. The non-transitory computer-readable medium of claim 29,
wherein the second portion corresponds to a Physical (PHY) header of the channel reservation message, and
wherein the first portion corresponds to a Medium Access Control (MAC) header of the channel reservation message.

32. The non-transitory computer-readable medium of claim 29, wherein the code for encoding the second portion comprises code for encoding one or more rate, length, or reserved bits in a Legacy Signal (L-SIG) field of a Physical Layer Convergence Protocol (PLCP) header.

33. The non-transitory computer-readable medium of claim 29, wherein the code for selecting the duration selects the duration for the channel reservation message further based on a predetermined set of one or more values of the length field that identify an association with the primary RAT.

34. The non-transitory computer-readable medium of claim 29, wherein the code for encoding of the second portion comprises:
code for selecting a transmission rate for the channel reservation message based on one of the transmission opportunity duration or the operator identifier;
code for setting a rate field of the channel reservation message based on the selected transmission rate;
code for selecting the duration for the channel reservation message based on the other of the transmission opportunity duration or the operator identifier; and
code for setting the length field of the channel reservation message based on the selected duration.

* * * * *